(12) United States Patent
Shen (10) Patent No.: US 6,940,642 B2
(45) Date of Patent: Sep. 6, 2005

(54) APPARATUS AND METHOD FOR STABILIZING AN OPTICAL TUBE ON A BASE

(76) Inventor: Dar Tson Shen, 1210 Chartwell Drive, West Vancouver, B.C. Vancouver (CA)

( * ) Notice: Subject to any disclaimer, the term of this patent is extended or adjusted under 35 U.S.C. 154(b) by 0 days.

(21) Appl. No.: 10/287,000

(22) Filed: Nov. 4, 2002

(65) Prior Publication Data

US 2004/0085632 A1 May 6, 2004

(51) Int. Cl.$^7$ ............................................. G02B 23/00
(52) U.S. Cl. .......................... 359/430; 359/409; 359/399
(58) Field of Search ................................. 359/430, 409, 359/399, 554, 555

(56) References Cited

U.S. PATENT DOCUMENTS

| | | |
|---|---|---|
| 2,711,589 A | 6/1955 | Stock |
| 3,606,520 A | 9/1971 | Rockwell |
| 3,776,494 A | 12/1973 | Baucheron |
| 3,779,626 A | 12/1973 | Korrenn et al. |
| 3,951,511 A | 4/1976 | Parsons |
| 4,027,943 A * | 6/1977 | Everett ........................ 359/399 |
| 4,129,280 A | 12/1978 | Ruegg et al. |
| 4,145,021 A | 3/1979 | Gaechter et al. |
| D253,238 S | 10/1979 | Drauglis et al. |
| D253,598 S | 12/1979 | Bressler |
| 4,458,868 A | 7/1984 | Hess |
| 4,470,672 A | 9/1984 | Drauglis |
| 4,611,777 A | 9/1986 | Ireland et al. |
| 4,671,130 A * | 6/1987 | Byers ........................... 74/425 |
| 4,763,151 A | 8/1988 | Klinger |
| 4,904,071 A | 2/1990 | Harbour |
| 5,029,995 A | 7/1991 | Weyrauch et al. |
| 5,229,781 A | 7/1993 | Losquadro et al. |
| D369,369 S | 4/1996 | Wray |
| D375,507 S | 11/1996 | Hsu |
| D392,657 S | 3/1998 | Diebel et al. |
| D412,920 S | 8/1999 | Diebel et al. |
| 6,278,561 B1 | 8/2001 | Teske et al. |
| D454,899 S | 3/2002 | Hedrick et al. |
| 6,445,498 B1 * | 9/2002 | Baun et al. .................. 359/430 |
| 6,546,639 B2 * | 4/2003 | Singer et al. ................. 33/391 |
| 2002/0050180 A1 | 5/2002 | Voigt et al. |

FOREIGN PATENT DOCUMENTS

| | | |
|---|---|---|
| DE | 1378946 | 1/1975 |
| WO | WO 00/25168 | 5/2000 |

* cited by examiner

*Primary Examiner*—Drew A. Dunn
*Assistant Examiner*—Joshua L. Pritchett
(74) *Attorney, Agent, or Firm*—Clark Wilson LLP (57) ABSTRACT

An apparatus and method for stabilizing an optical tube on a base wherein a tension adjuster adapted to adjust the tension between the optical tube and sideboard of the base is secured between a the optical tube and the sideboard. By turning the tension adjuster, tension can be added or reduced to stabilize the optical tube.

18 Claims, 11 Drawing Sheets

APPARATUS AND METHOD FOR STABILIZING AN OPTICAL TUBE ON A BASE

NOTICE REGARDING COPYRIGHTED MATERIAL

A portion of the disclosure of this patent document contains material which is subject to copyright protection. The copyright owner has no objection to the facsimile reproduction of the patent document or the patent disclosure as it appears in the public Patent Office file or records but otherwise reserves all rights.

TECHNICAL FIELD

This invention relates to a device for stabilizing an optical tube on a Dobsonian mount, and more particularly, an apparatus for adjusting the tension between an optical tube and the sideboard of a saddle Dobsonian mount and a cradle ring Dobsonian mount.

BACKGROUND

The Dobsonian mounted telescope is popular among amateur astronomers and telescope makers because of its simplicity. The Dobsonian mount is a form of an alt-azimuth mount adapted to carry a Newtonian reflector telescope. An alt-azimuth mount has an altitude axis on which the telescope pivots vertically and an azimuth axis on which the telescope rotates horizontally. In its simplest form, the typical Dobsonian mount consists of a saddle which allows the optical tube of the telescope to pivot in altitude, while the ground board is swivelled in azimuth. Traditional Dobsonian mounts are typically set on the ground for observing but a more compact tabletop version of the Dobsonian mount is also available.

The Dobsonian mount usually relies on the friction between the side bearings on the optical tube of the telescope and a frictional material on the saddle to hold the optical tube in place. If there is too much friction, the telescope is difficult to move to centre an object in the field of view. If there is too little friction, the telescope will not stay where it is positioned. This makes stabilizing the optical tube of the telescope difficult when using a Dobsonian mount, especially when accessories, such as a finderscope or an eyepiece, are added to the optical tube. As long as the amount of friction is at an appropriate level, and therefore stabilization of the optical tube is achieved, the telescope can remain in its desired position to view an object and maintain its position even when the mount is rotated to track an object as the Earth turns.

Various devices designed to assist in stabilizing telescopes on different types of mounts exist in the prior art. For example, Stock, U.S. Pat. No. 2,712,589 discloses a slidable weight to counter balance the weight of the telescope on an equatorial mount. Drauglis, U.S. Pat. No. 4,470,672 discloses a form of alt-azimuth mount wherein adjusters are used to regulate the tension between the cradle and the mounting ring to balance the telescope secured to the mounting ring. Baun et. al., WO 00/25168 discloses altitude and azimuth friction locks that both must be adjusted to inhibit movement of the telescope. Some Dobsonian mounts employ springs to aid in stabilization.

The devices for stabilizing a telescope currently available in the art are inconvenient to use because they do not provide a simple and user-friendly means to adjust the friction between the optical tube of a telescope and the Dobsonian mount.

SUMMARY OF THE INVENTION

It is an object of this invention to provide an apparatus for stabilizing the optical tube of a telescope on a Dobsonian mount, namely, a tension adjuster that users can easily turn to add or reduce tension, thereby increasing or decreasing the friction between the optical tube of a telescope and the sideboard of the Dobsonian mount. Such tension adjuster can be used with a two sideboard Dobsonian mount (i.e. saddle Dobsonian mount), which is usually set on the ground for observing, and a one sideboard Dobsonian mount (i.e. cradle ring Dobsonian mount), which may be set on a tabletop for observing. By providing such a tension adjuster, the telescope does not need to be balanced in order to stay in position.

It is a further object of this invention to provide a means for transporting a telescope without having to remove the telescope from its mount. Proper transporting of the telescope on a saddle Dobsonian mount involves at least two reasonably fit people lifting the telescope by two handles properly secured to the sideboards. Transporting the telescope on a cradle ring Dobsonian mount involves only one person lifting the telescope properly secured to the cradle ring Dobsonian mount.

The present invention is an apparatus and a method for stabilizing an optical tube on a base with either two sideboards or one sideboard. With respect to stabilizing an optical tube on a base comprising a first and second sideboard, the apparatus is comprised of a handle adapted to add or reduce tension, thereby increasing or decreasing the friction between the optical tube and the first sideboard. When the optical tube is mounted on such a base, two bearings attached to the sides of the optical tube rest on the support members attached to the two sideboards. Friction members are attached to the side bearings. An attachment member of the handle is inserted through an aperture on the first sideboard and secured to a receiving member set in the first bearing. A second attachment member of a second handle can also be inserted through a second aperture on the second sideboard and secured to a receiving member set in the second bearing.

With respect to stabilizing an optical tube on a base comprising a first sideboard, the apparatus is comprised of a knob adapted to add or reduce tension, thereby increasing or decreasing the friction between the optical tube and the sideboard. When the optical tube is mounted on such a base, an attachment member, which is fixed to a bearing attached to a holding ring, which is secured around the optical tube, is inserted through an aperture on the sideboard. A friction member is attached to the bearing. The attachment member is secured to the knob which comprises a receiving member adapted to receive the attachment member.

The method of stabilizing an optical tube on a base comprising one sideboard or two sideboards involves turning the tension adjuster to add or reduce tension to increase or decrease the amount of friction between the optical tube and the sideboard. By turning the tension adjuster to add tension, thereby increasing friction between the optical tube and the sideboard, the optical tube remains in a desired position. The tension adjuster can be tightened such that the optical tube can stay in a position but can still be moved when prompted to adjust the position of the optical tube. Alternatively, the tension adjuster can be completely tightened to hold the optical tube in position. When the user moves the optical tube to another position, the user turns the tension adjuster to decrease the tension, thereby reducing friction between the optical tube and the sideboard.

BRIEF DESCRIPTION OF FIGURES

Further objects, features and advantages of the present invention will become more readily apparent to those skilled in the art from the following description of the invention when taken in conjunction with the accompanying drawings, in which.

DETAILED DESCRIPTION OF PREFERRED EMBODIMENTS

Figure 7:
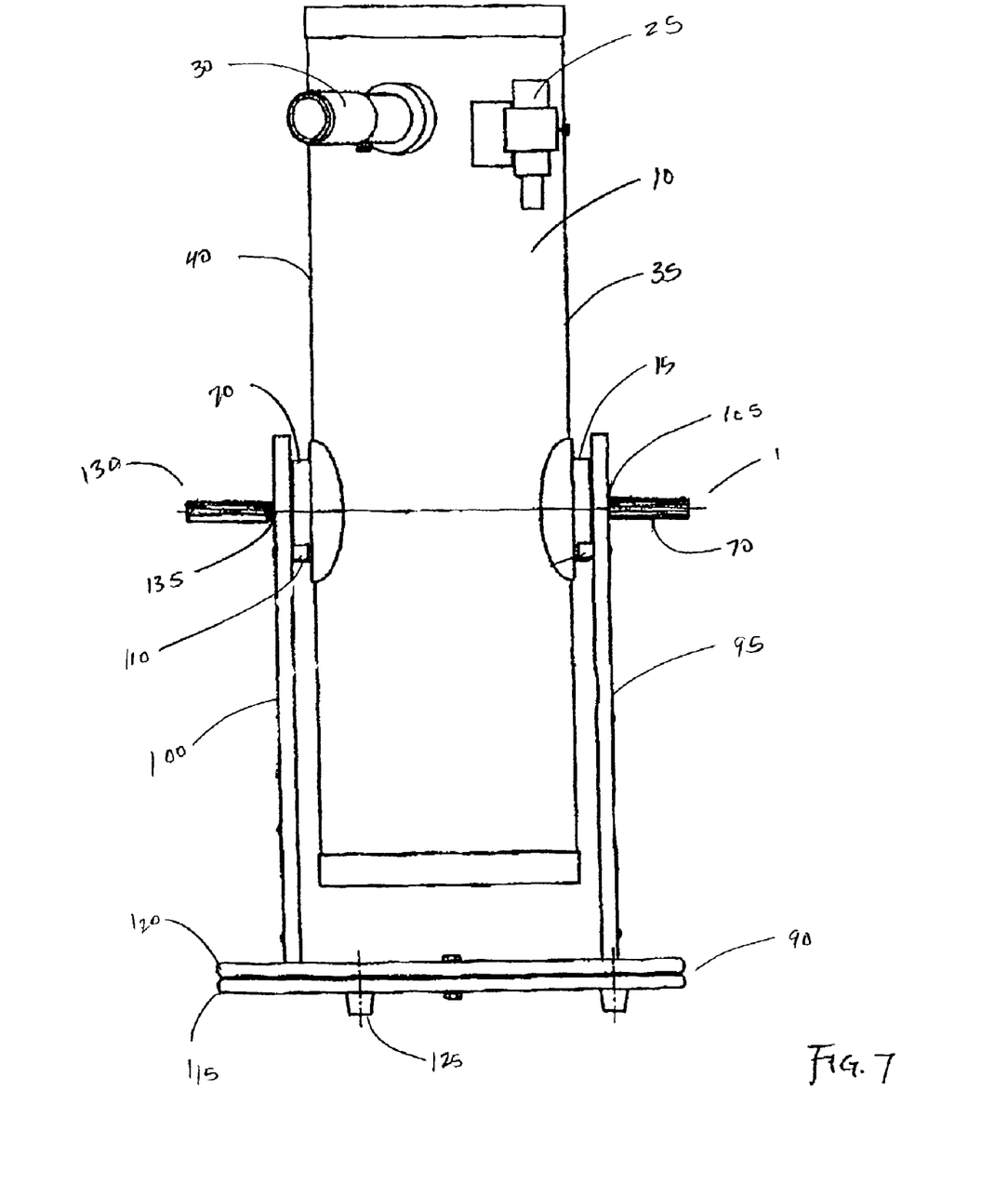
FIG. 7 is a front view of the telescope on a saddle Dobsonian mount with a preferred embodiment of the apparatus for stabilizing an optical tube.
Figure 10:
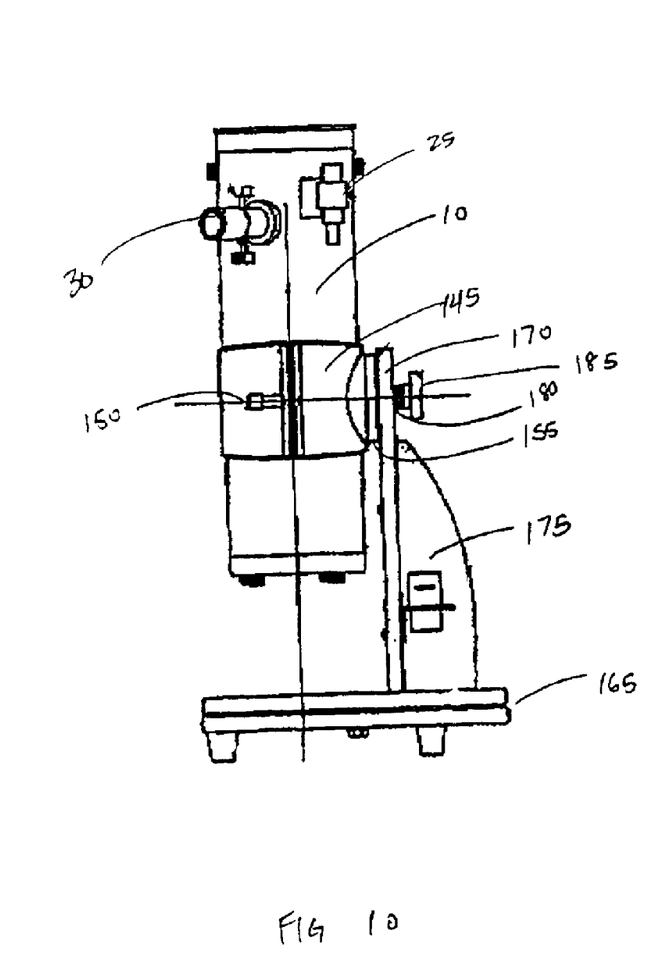
FIG. 10 is a front view of the telescope on a cradle ring Dobsonian mount with a preferred embodiment of the apparatus for stabilizing an optical tube.

The following detailed description will be made with reference to two preferred embodiments of an apparatus for stabilizing an optical tube on a base, particularly, a handle adapted to adjust tension between the optical tube and the sideboard of a saddle Dobsonian mount (as seen in FIG. 7) and a knob adapted to adjust tension between the optical tube and the sideboard of a cradle ring Dobsonian mount (as seen in FIG. 10). In this document, the term "saddle Dobsonian mount" means a Dobsonian mount with two sideboards and "cradle ring Dobsonian mount" means a Dobsonian mount with one sideboard. The saddle Dobsonian mount and the cradle ring Dobsonian mount are both referred to as a base. The term "tension adjuster" means the handle or the knob, as appropriate.

Figure 1:
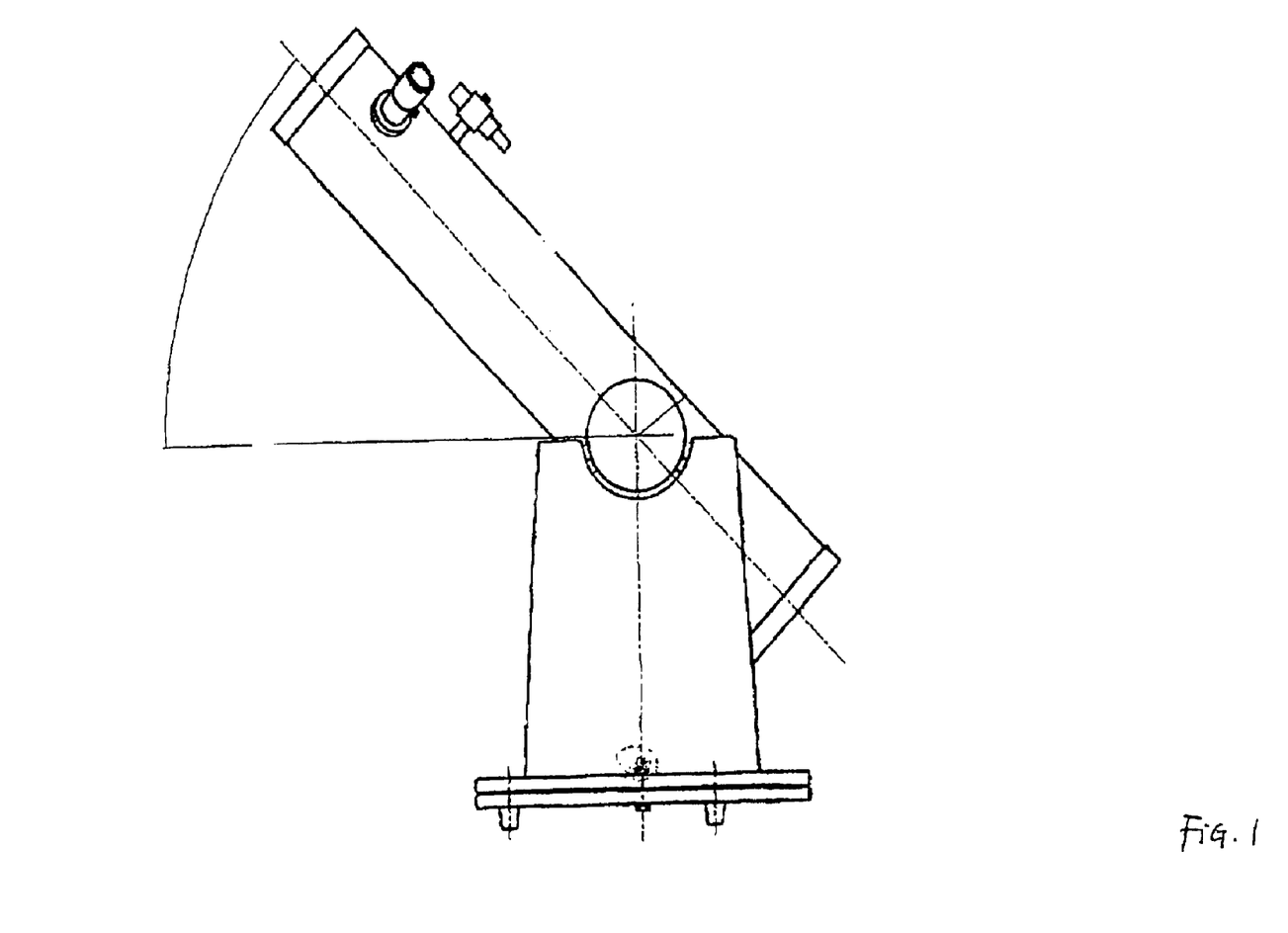
FIG. 1 is a side view of a prior art telescope on a saddle Dobsonian mount.

In a typical saddle Dobsonian mount, as shown in FIG. 1, the balance point of the optical tube is designed to fall approximately at the midpoint between the two bearings which are positioned on the altitude axis. Proper balance is critical to the performance of a telescope. If a telescope is correctly balanced, it will remain in a desired position and maintain such position even when moved on the altitude or azimuth axis. Depending on the structure and material of the optical tube and the accessories attached to the optical tube, for example, a finderscope or an eyepiece, the balance point can easily fall out of the altitude axis, resulting in undesired movements of the optical tube on the altitude axis. As a result, means to stabilize the optical tube of a telescope have been developed to overcome such problem.

Figure 2:
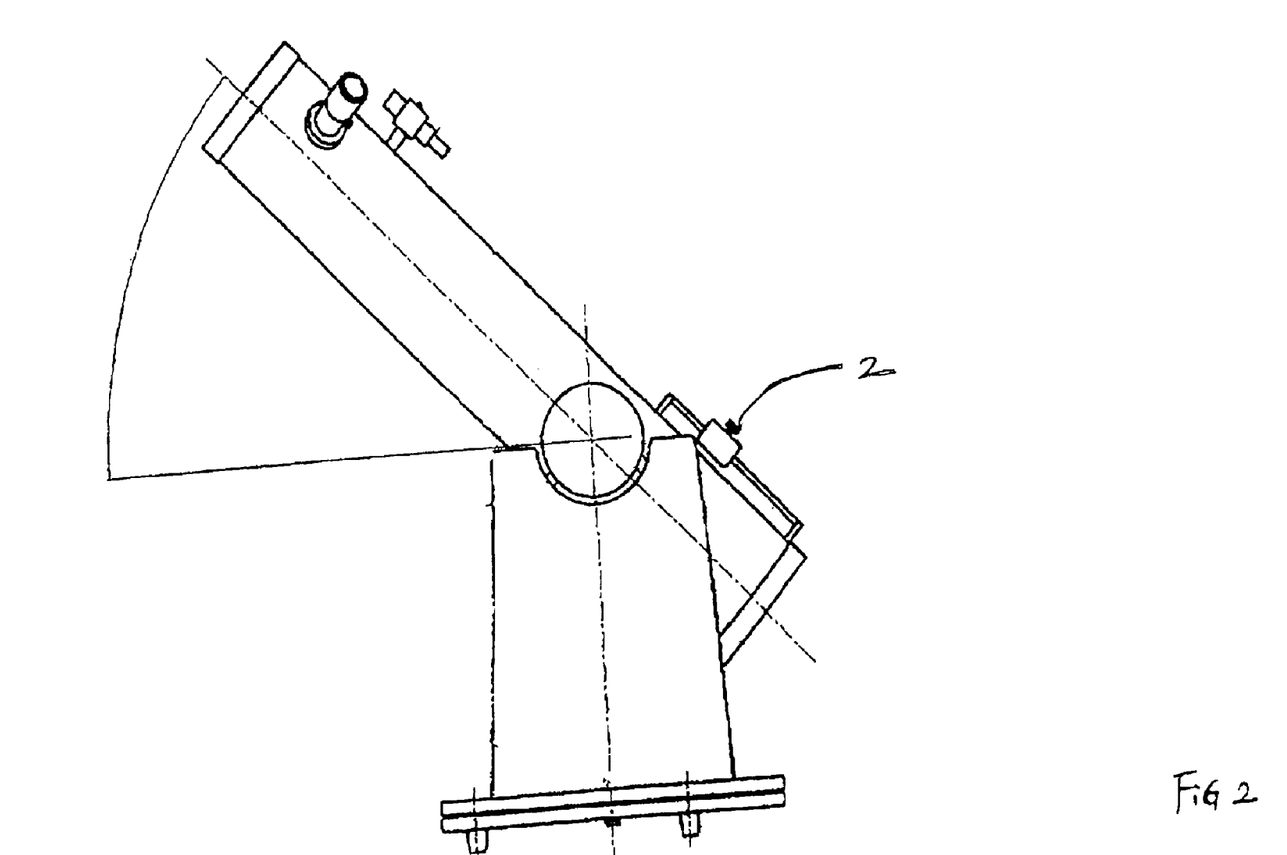
FIG. 2 is a side view of a prior art saddle Dobsonian mount using a slidable weight to counter balance the weight of the telescope.

One solution in the prior art to stabilize the optical tube is to add a slidable counterweight 2 to the end of the optical tube, as shown in FIG. 2. By sliding the counterweight up and down, the balance point of the optical tube can be manually adjusted to fall on the altitude axis. However, such counterweight is an unnecessary obstruction attached to the optical tube, adds needless weight to the telescope, and it can be difficult to locate the necessary balance point.

Figure 3:
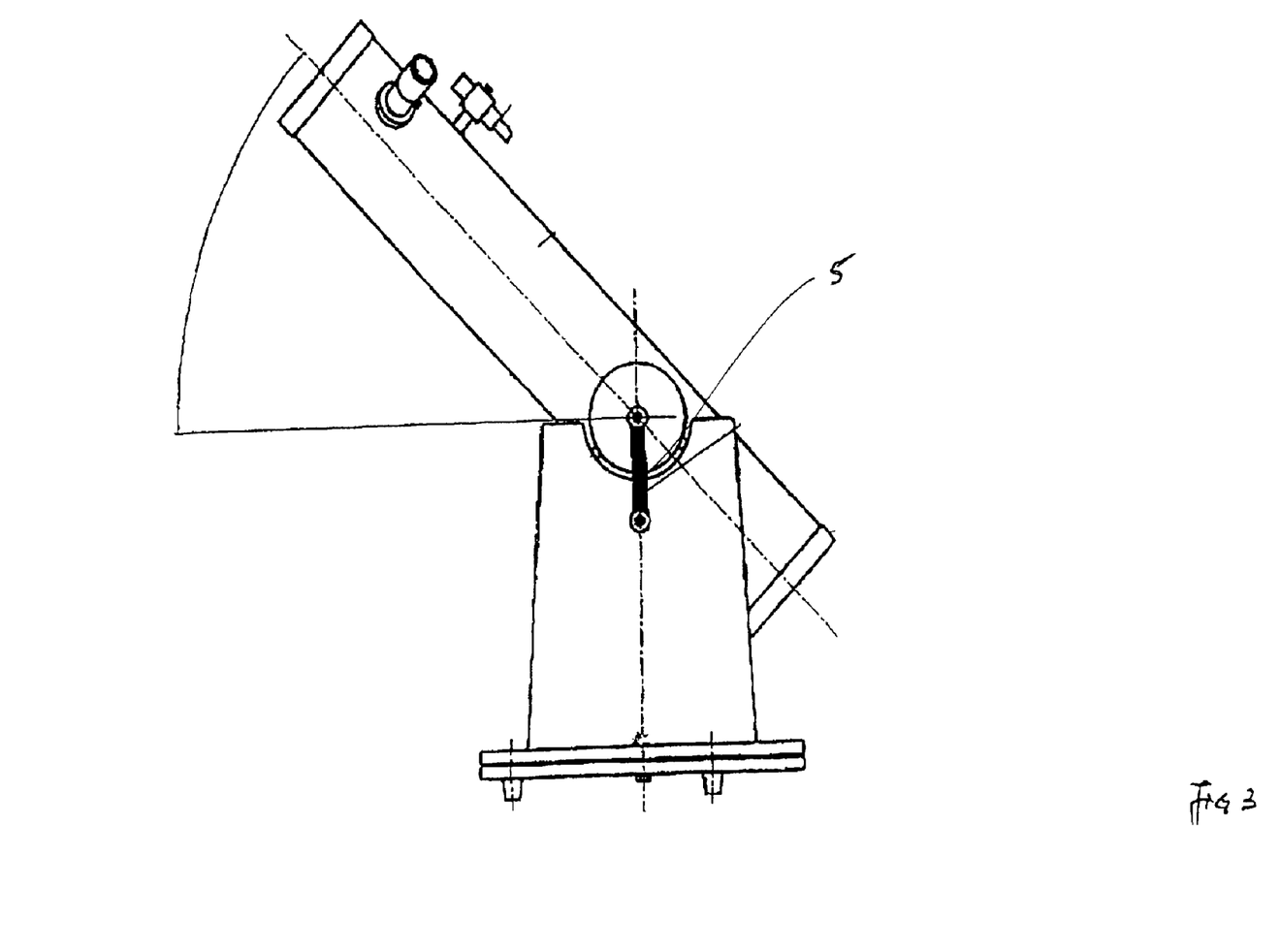
FIG. 3 is a side view of a prior art saddle Dobsonian mount using a spring to stabilize the telescope.

Another means to balance the optical tube is to attach springs 5 between the side bearings of the telescope and the sideboards of the saddle Dobsonian mount, as shown in FIG. 3. However, using such springs is not a reliable means to stabilize the optical tube.

Figure 5:
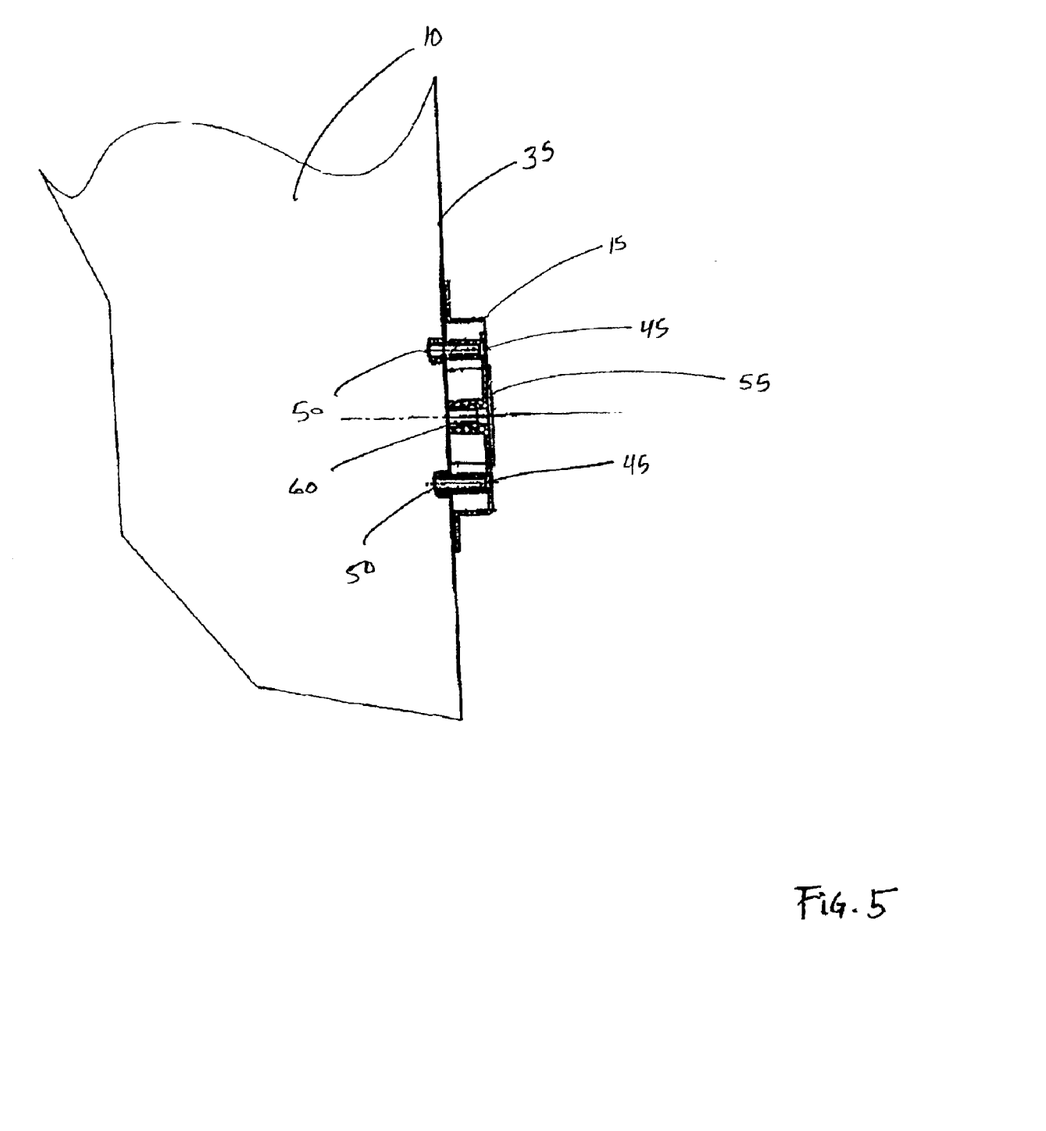
FIG. 5 is a side view of a bearing fixed to a side of the optical tube of a telescope.
Figure 6:
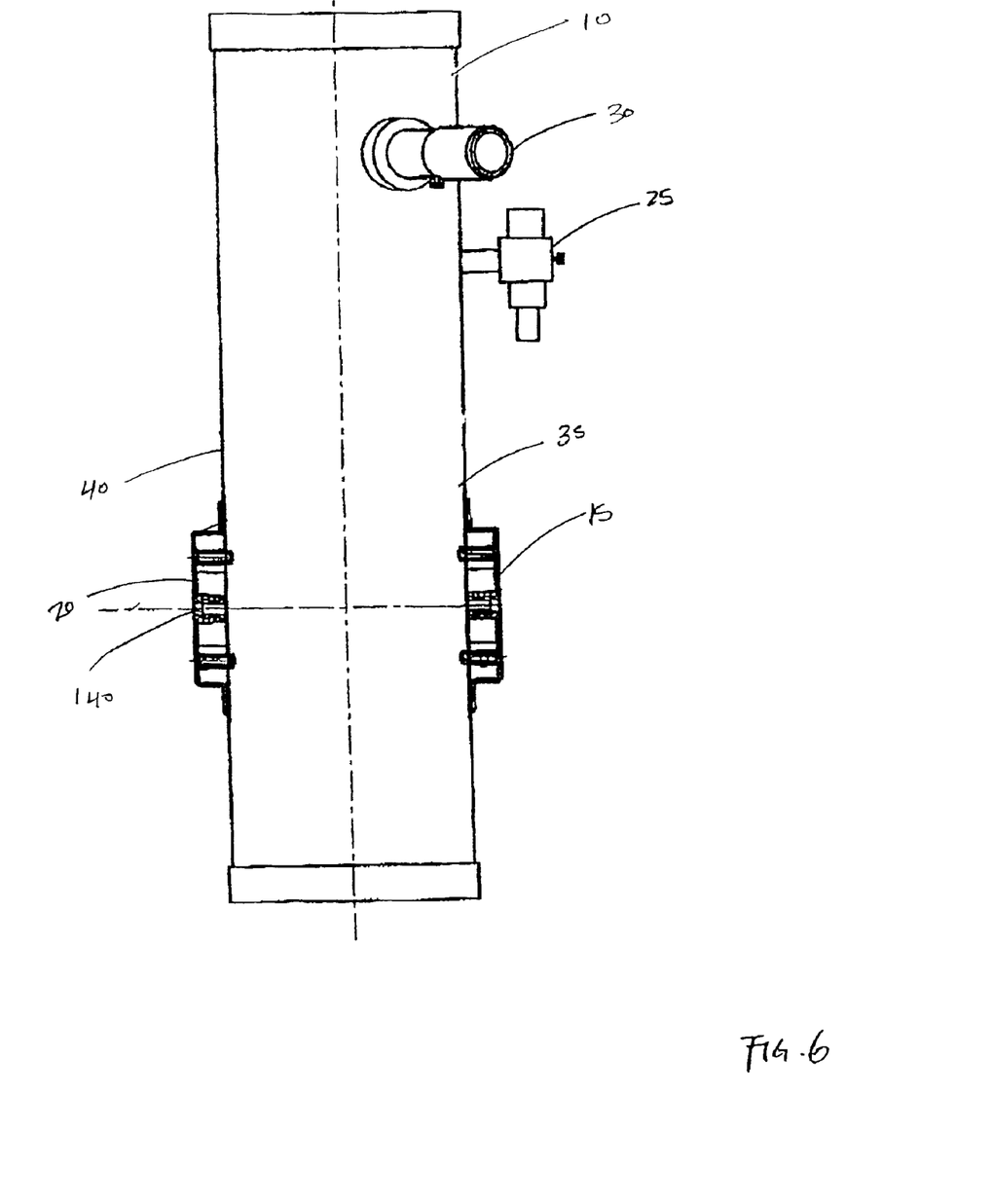
FIG. 6 is a front view of the optical tube of a telescope.

In one preferred embodiment, the telescope to be mounted on a saddle Dobsonian mount comprises optical tube 10, first bearing 15, second bearing 20, finderscope 25, and eyepiece 30, as seen in FIG. 6. First bearing 15 and second bearing 20 are attached to first side 35 of optical tube 10 and second side 40 of optical tube 10 respectively, by conventional fixing means. In the preferred embodiment, first bearing 15 and second bearing 20 are fixed to optical tube 10 by two large screws 45 and two washers 50, as seen in FIG. 5. First bearing 15 and second bearing 20 are attached along the axis of the approximate balance point of optical tube 10. Typically, first bearing 15 and second bearing 20 are disc shaped and made of a plastic material such as polyvinyl chloride (PVC), polyethylene terepthalate (PET), acrylonitrile buadien styrene (ABS), polycaronate (PC), or a mixture of such plastic materials. First bearing 15 and second bearing 20 are mounting members for positioning optical tube 10 on the base.

The balance point is the point where the optical tube does not move when placed on the base. The current invention allows users to stabilize the optical tube even when the optical tube is not properly balanced. For example, the balance point of the optical tube shifts when different accessories are installed on the optical tube because of the additional weight. As such, the current invention allows users to stabilize the optical tube even when the balance point is so shifted by the extra weight of the accessories.

As seen in FIG. 5, friction member 55 is typically attached to at least one bearing, but may also be attached to the inner surface of first sideboard 95 or second sideboard 100. Friction member 55 is made of any frictional material such as Fiberlite™. Preferably, friction member 55 is attached to first bearing 15 and second bearing 20 by conventional adhesive means, such as two-sided tape.

Receiving member 60, sized to receive attachment member 65 of handle 1, is set in at least one bearing, as seen in FIG. 5. Preferably, receiving member 60 is an anchor nut set in first bearing 15 and second bearing 20.

Figure 4A:
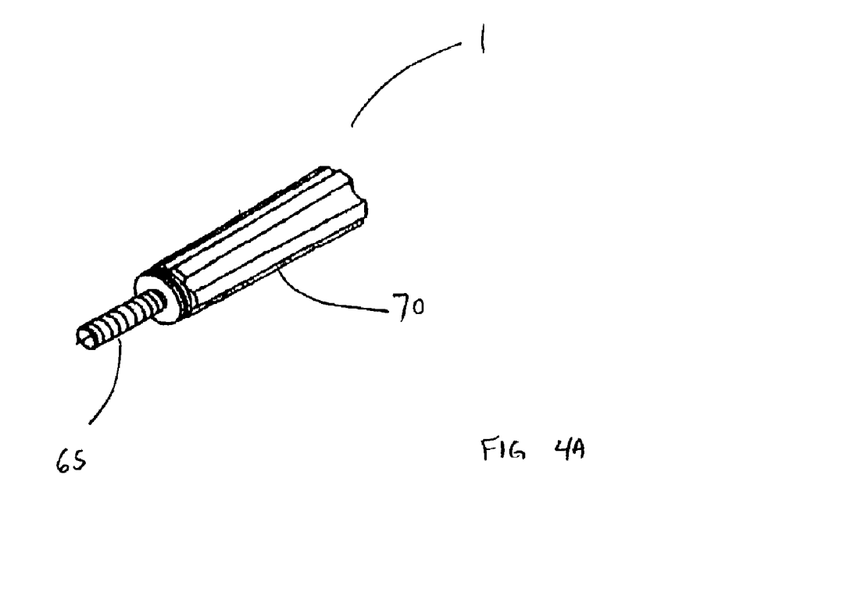
FIGS. 4a and 4b are a side view and a perspective view, respectively, of a preferred embodiment of a handle for adding and reducing tension between an optical tube and the sideboard of a saddle Dobsonian mount.
Figure 4B:
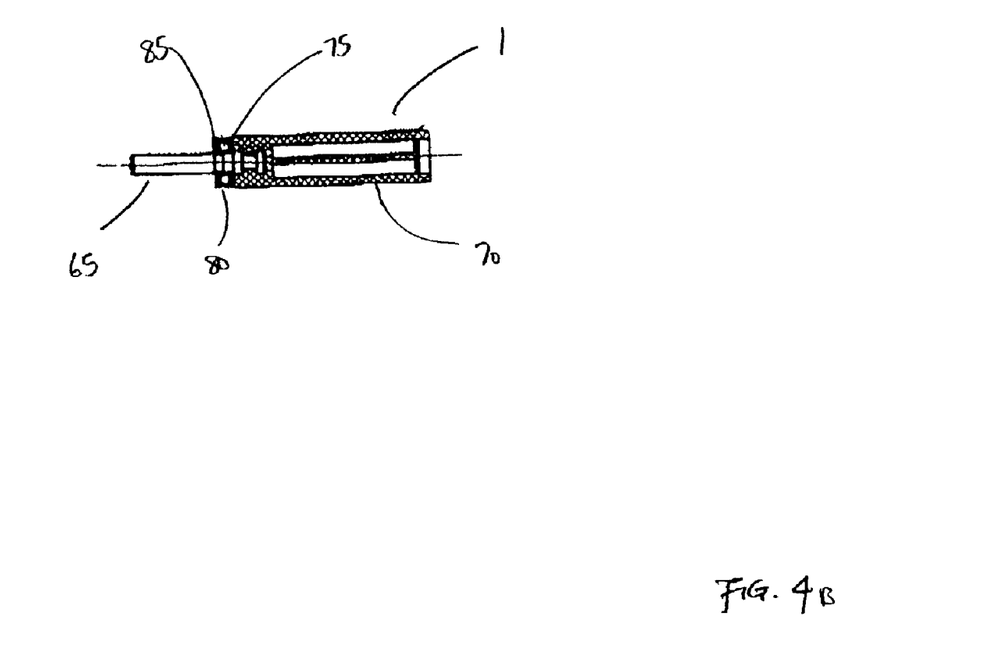

As illustrated in FIGS. 4a and 4b, handle 1 according to the invention includes grip 70, attachment member 65, washer 75, thrust ball bearing 80, and threaded washer 85. Washer 75, thrust ball bearing 80, and threaded washer 85 are positioned on attachment member 65 such that thrust ball bearing 80 is interposed between washer 75 and threaded washer 85 and washer 75 is adjacent to grip 70. Grip 70 is typically made of plastic and attachment member 65 is preferably a screw. Handle 1 is the tension adjuster adapted to increase and decrease the tension between optical tube 10 and first sideboard 95.

As illustrated in FIG. 7, in a preferred embodiment, the saddle Dobsonian mount adapted to carry optical tube 10 includes ground board 90 which rotates on the azimuth axis, first sideboard 95, second sideboard 100, aperture 105 on sideboard 95 adapted to accommodate attachment member 65, and support members 110 fixed on the inner surface of first sideboard 95 and second sideboard 100 such that first bearing 15 and second bearing 20 rest on support members 110. Ground board 90 is further comprised of stationary base 115 adapted to allow rotatable member 120 to be mounted by conventional rotary means positioned substantially at the center of stationary base 115. Rotatable member 120 allows the optical tube to move along the azimuth axis. Legs 125 are fixed to stationary base 110 to hold up the saddle Dobsonian mount. Typically, ground board 90, first sideboard 95, and second sideboard 100 are made of particle board but any material that can support the weight of optical tube 10 can be used. Support members 110 can be of any size and made of any non-friction material such as Teflon so long as support members 110 can permit optical tube 10 to pivot in altitude when optical tube 10 is mounted on the base. Preferably, support members 110 are comprised of four nylon cylindrical saddle side bearings fixed to the inner surface of first sideboard 95 and second sideboard 100 by conventional attaching means such as machine screws. Typically, two nylon cylindrical saddle side bearings are attached to each of the inner sides of first sideboard 95 and second sideboard 100. Aperture 105 is positioned on first sideboard 95 such that aperture 105 aligns with receiving member 60 when optical tube 10 is placed on support members 110 on first sideboard 95 and second sideboard 100.

Figure 8:
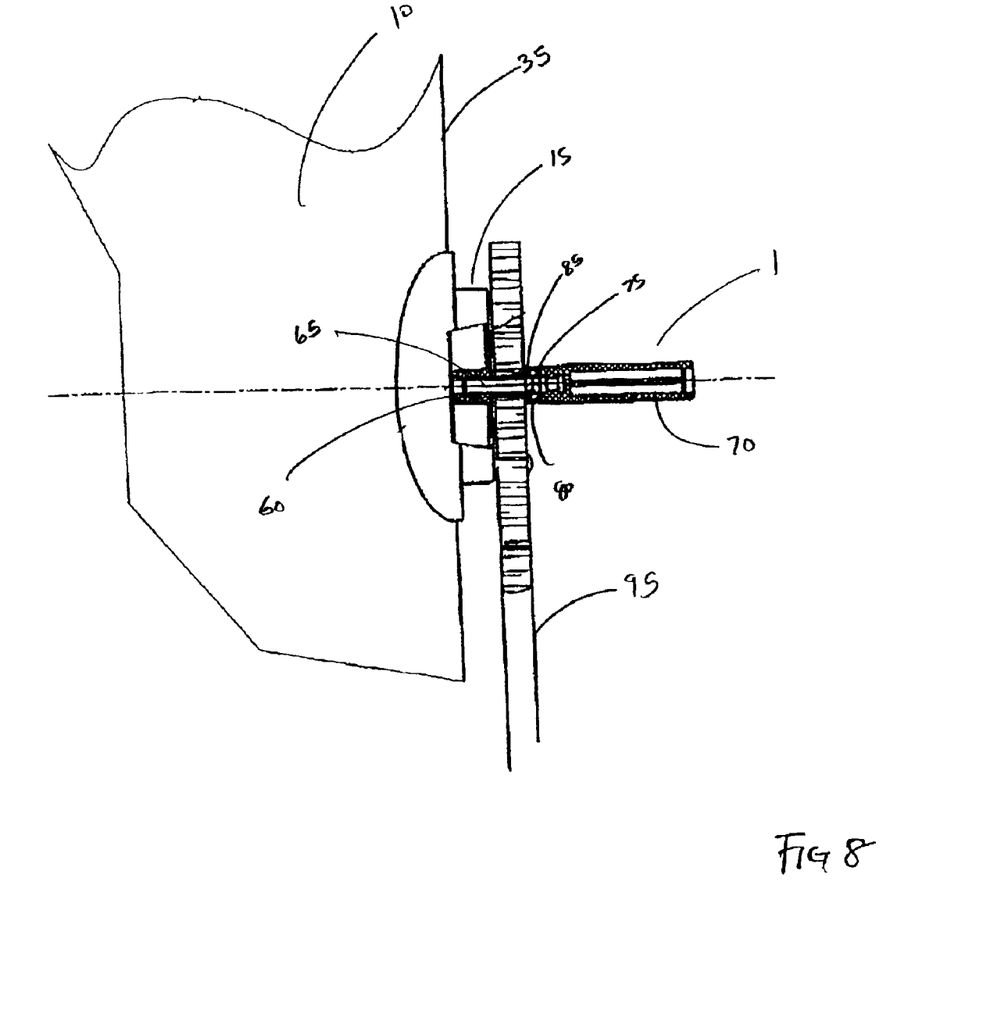
FIG. 8 is a side view of a portion thereof.

When optical tube 10 is placed on the base, first bearing 15 and second bearing 20 rest on support members 110 and aperture 105 aligns with receiving member 60. Attachment member 65 is inserted through aperture 105 and secured to receiving member 60, as seen in FIG. 8. In an alternative embodiment, an attachment member of second handle 130 is inserted through second aperture 135 in alignment with second receiving member 140 installed in second bearing 20, as seen in FIGS. 6 and 7.

To use handle 1 to adjust the tension between first sideboard 95 and optical tube 10, a user turns handle 1 to add or reduce the tension to stabilize optical tube 10 on the altitude axis in a desired position. When the user wants to secure optical tube 10 in a desired position, the user turns handle 1 to increase the tension between first sideboard 95 and optical tube 10 such that optical tube 10 remains in the desired position. Typically, handle 1 is tightened such that optical tube 10 can stay in a position but can still be moved when prompted to adjust the position of optical tube 10. Alternatively, handle 1 can be completely tightened to hold optical tube 10 in position and adjustments can be made by turning handle 1 to decrease the tension between first sideboard 95 and optical tube 10 to move optical tube 10 to another desired position.

Figure 9:
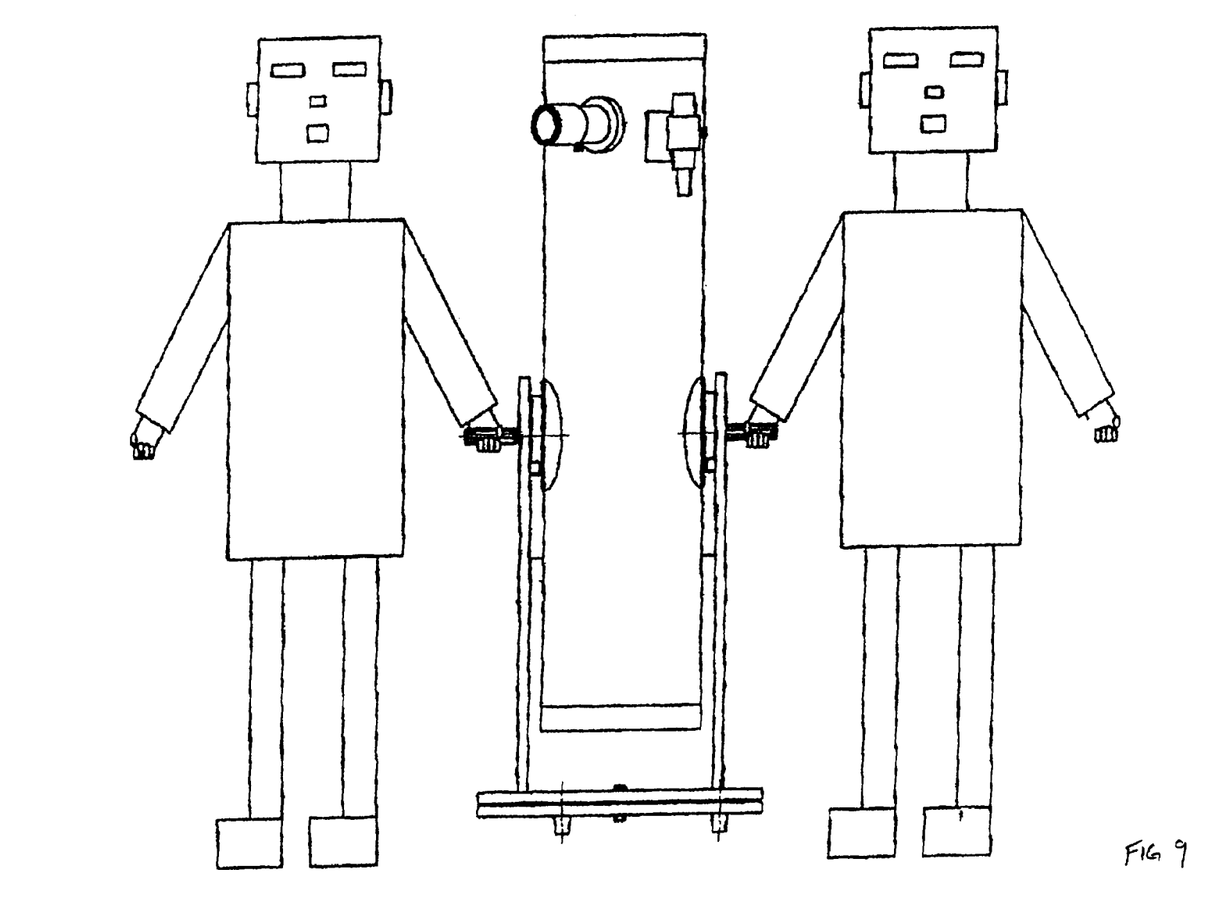
FIG. 9 depicts the method of transporting an optical tube while attached to a saddle Dobsonian mount, as described in the application.

In an alternative embodiment where handle 1 and second handle 130 are attached to optical tube 10 and first sideboard 95 and second sideboard 100 respectively, a user can transport optical tube 10 while attached to the base by lifting both handle 1 and second handle 130. Proper transporting of optical tube 10 on a base requires at least two reasonably fit people lifting the optical tube secured to the base by handle 1 and second handle 130 that are both completely tightened.

Figure 11:
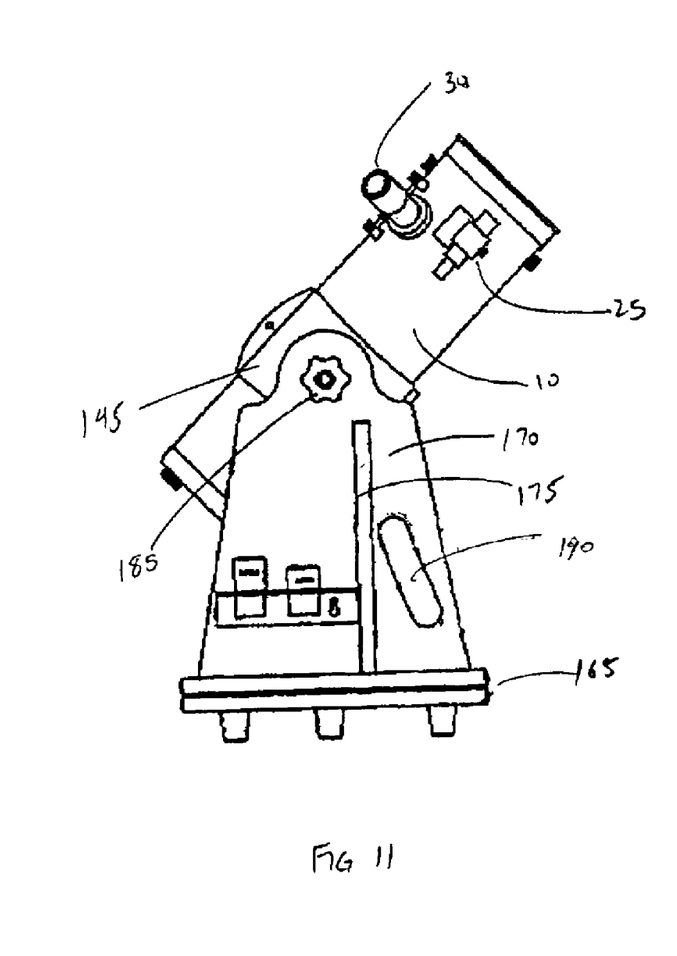
FIG. 11 is a side view thereof.

As illustrated in FIG. 10 and FIG. 11, another embodiment of an apparatus for stabilizing an optical tube on a base is the telescope mounted on a cradle ring Dobsonian mount, comprising optical tube 10, finderscope 25, eyepiece 30, friction member 55, holding ring 145, holding ring fastener 150, and bearing 155. Bearing 155 is preferably molded to form a part of holding ring 145, but may be a separate piece attached to holding ring 45 by conventional means. Bearing 155 is typically disc shaped and made of the same material as holding ring 145. In the preferred embodiment, holding ring 145 and bearing 155 are made of metal, but can be any material so long as it is capable of supporting the weight of optical tube 10. Friction member 55, as described above, is made of any frictional material such as Fiberlite™, and is attached to bearing 155 by conventional adhesive means, such as two sided tape.

Holding ring 145 is secured around optical tube 10 by holding ring fastener 150. Holding ring fastener 150 can be any conventional securing means, but holding ring fastener 150 is preferably a bolt. The position of holding ring 145 around optical tube 10 can be adjusted by loosening holding ring faster 150, shifting the position of optical tube 10, and re-tightening holding ring fastener 150. The position of optical tube 10 can be adjusted in this manner to position eyepiece 30 and/or finderscope 25 in a comfortable viewing position. Alternatively, the position of optical tube 10 can be adjusted to balance optical tube 10 when additional accessories are added to optical tube 10. Holding ring 145 is secured around optical tube 10 at the approximate balance point of optical tube 10. As the balance point of optical tube 10 changes with the addition of accessories, the position of holding ring 145 can be shifted to adjust to the change in balance point.

Figure 12:
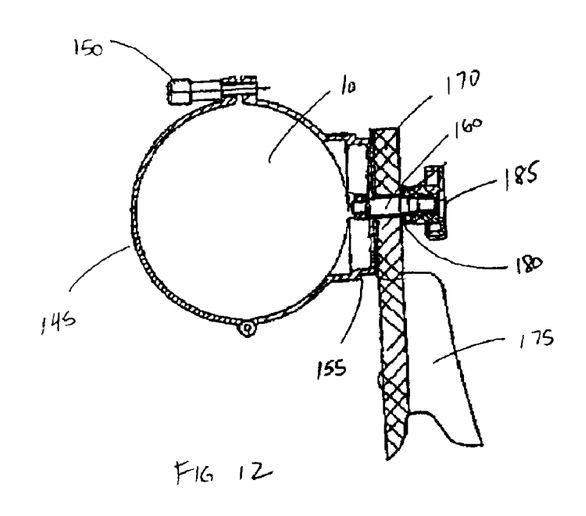
FIG. 12 is a side view of a preferred embodiment of a knob for adding and reducing tension between an optical tube and the sideboard of a cradle ring Dobsonian mount.
Figure 13:
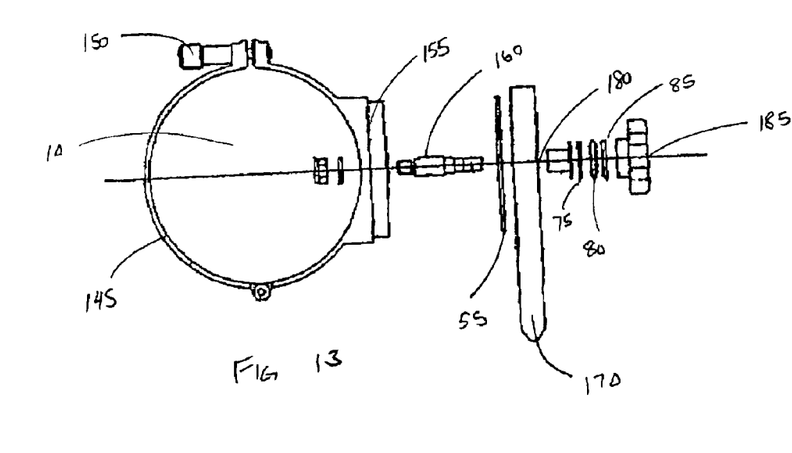
FIG. 13 is an exploded view thereof.

Attachment member 160 is fixed to bearing 155 by conventional means, as seen in FIG. 12 and FIG. 13. Preferably, attachment member 160 is a screw fixed to bearing 155 by a locking nut and washer. Bearing 155 with attachment member 160 is the mounting member for positioning optical tube 10 on the base. Holding ring 145 is the support member for bearing 155.

As illustrated in FIG. 10 and FIG. 11, the cradle ring Dobsonian mount adapted to carry optical tube 10 includes ground board 165 which rotates on the azimuth axis, sideboard 170, support board 175, and aperture 180 on sideboard 170 adapted to accommodate attachment member 160. The description of ground board 165 is substantially the same as described above with respect to ground board 90 of the saddle Dobsonian mount. Support board 175 provides support to sideboard 170 and ground board 165, support board 175, and sideboard 170 are typically made of particle board. Aperture 180 is positioned on sideboard 170 such that optical tube 10 can pivot in altitude when attachment member 160 is inserted through aperture 180.

To position optical tube 10 on the base, attachment member 160 fixed to bearing 155, which is molded to form a part of holding ring 145, which is secured around optical tube 10, is inserted through aperture 180. As seen in FIG. 12, knob 185 comprises a receiving member sized to receive attachment member 160. Preferably, the receiving member of knob 185 is an anchor nut. Before securing attachment member 160 to the receiving member of knob 185, washer 75, thrust ball bearing 80 and threaded washer 85 are positioned on attachment member 160 such that thrust ball bearing 80 is interposed between washer 75 and threaded washer 85 and threaded washer 85 is adjacent to knob 185 when attachment member 160 is secured in the receiving member. Knob 185 is the tension adjuster adapted to increase and decrease the tension between optical tube 10 and sideboard 170.

As seen in FIG. 11, second aperture 190 on sideboard 170 is adapted for gripping and transporting optical tube 10 mounted on the base. A user can lift and transport optical tube 10 mounted on the base by gripping aperture 190. Aperture 190 can be any size or shape as long as a user can securely grip sideboard 170. Proper transporting of optical tube 10 on the base requires attachment member 160 to be completely secured to the receiving member of knob 185.

To use knob 185 to adjust the tension between sideboard 170 and optical tube 10, a user turns knob 185 to add or reduce the tension to stabilize optical tube 10 on the altitude axis in a desired position, similar to the method described above with respect to the use of handle 1.

While the principles of the invention have now been made clear in the illustrated embodiments, it will be immediately obvious to those skilled in the art that many modifications may be made of structure, arrangements, and algorithms used in the practice of the invention, and otherwise, which are particularly adapted for specific environments and operational requirements, without departing from those principles. The claims are therefore intended to cover and embrace such modifications within the limits only of the true spirit and scope of the invention.

What is claimed is:

1. An apparatus for stabilizing an optical tube, comprising:
   (a) a base having a sideboard,
   (b) a mounting member adapted to engage the optical tube,
   (c) an attachment member adapted to attach the mounting member to the sideboard such that the mounting member is operable to pivot with respect to the sideboard about an axis of rotation, and
   (d) a tension adjuster comprising a thrust ball bearing positioned to circumscribe the axis of rotation and aligned to bear thrust substantially parallel to the axis of rotation, wherein the thrust ball bearing is adjacent the sideboard, the tension adjuster being operable to adjust the friction force between the sideboard and the mounting member,
   whereby the tension adjuster may be operated to adjust the friction force to retain the optical tube in a desired disposition and the optical tube may subsequently be rotated about the axis of rotation without necessitating that the tension adjuster be operated to readjust the friction force.

2. An apparatus as claimed in claim 1, wherein said mounting member further comprises a bearing surface opposite the sideboard.

3. An apparatus as claimed in claim 2, further comprising a friction member positioned between the sideboard and the bearing surface and operable to oppose pivoting of the mounting member about the axis of rotation.

4. An apparatus as claimed in claim 1, wherein the axis of rotation is coaxial with the longitudinal axis of the attachment member.

5. An apparatus as claimed in claim 4, wherein:
   (a) the attachment member further comprises an external thread, and
   (b) the tension adjuster further comprises:
      (i) a washer mounted on the attachment member, and
      (ii) a threaded washer mounted on the attachment member and threadedly engaging the external thread,
   the washer and the threaded washer being operable to apply opposing forces to opposite faces of the thrust ball bearing.

6. An apparatus as claimed in claim 5, wherein the tension adjuster further comprises a handle adapted to engage the attachment member and operable to transmit a rotational force to rotate the external thread with respect to the threaded washer and wherein the washer, the thrust ball bearing and the threaded washer are located between the handle and the sideboard.

7. An apparatus as claimed in claim 5, wherein the mounting member further includes a holding ring operable to circumscribe the optical tube.

8. An apparatus as claimed in claim 1, further comprising:
   (a) a second sideboard opposite the sideboard,
   (b) a second mounting member opposite the mounting member and adapted to engage the optical tube, and
   (c) a second attachment member adapted to attach the second mounting member to the second sideboard such that the second mounting member is operable to pivot with respect to the second sideboard about the axis of rotation.

9. An apparatus for stabilizing an optical tube, comprising:
   (a) a base having a sideboard,
   (b) a mounting member adapted to engage the optical tube,
   (c) means for attaching the mounting member to the sideboard such that the mounting member is operable to pivot with respect to the sideboard about an axis of rotation, and
   (d) means for adjusting tension, comprising means for bearing thrust substantially parallel to the axis of rotation in circumscription of the axis of rotation, wherein the means for bearing thrust is adjacent the sideboard, the means for adjusting tension being operable to adjust the friction force between the sideboard and the mounting member,
   whereby the means for adjusting tension may be operated to adjust the friction force to retain the optical tube in a desired disposition and the optical tube may subsequently be rotated about the axis of rotation without necessitating that the means for adjusting tension be operated to readjust the friction force.

10. An apparatus as claimed in claim 9, wherein said mounting member further comprises a bearing surface opposite the sideboard.

11. An apparatus as claimed in claim 10, further comprising means for increasing the coefficient of friction between the sideboard and the bearing surface and operable to oppose pivoting of the mounting member about the axis of rotation.

12. An apparatus as claimed in claim 9, wherein the axis of rotation is coaxial with the longitudinal axis of the attachment member.

13. An apparatus as claimed in claim 12, wherein:
   (a) the attachment member further comprises an external thread, and
   (b) the means for adjusting tension further comprises:
      (i) a washer mounted on the attachment member, and
      (ii) a threaded washer mounted on the attachment member and threadedly engaging the external thread,
   the washer and the threaded washer being operable to apply opposing forces to means for bearing thrust.

14. An apparatus as claimed in claim 13, wherein the means for adjusting tension further comprises a handle adapted to engage the attachment member and operable to transmit a rotational force to rotate the external thread with respect to the threaded washer and wherein the washer, means for bearing thrust and the threaded washer are located between the handle and the sideboard.

15. An apparatus as claimed in claim 14, wherein the mounting member further includes a holding ring operable to circumscribe the optical tube.

16. An apparatus as claimed in claim 9, further comprising:

(a) a second sideboard opposite the sideboard, (b) a second mounting member opposite the mounting member and adapted to engage the optical tube, and (c) second means for attaching the second mounting member to the second sideboard such that the second mounting member is operable to pivot with respect to the second sideboard about the axis of rotation.

17. An apparatus for stabilizing an optical tube, comprising:

(a) a base having a sideboard, the sideboard defining hole, (b) a mounting bracket adapted to engage the optical tube, the mounting bracket having a threaded nut, (c) a bolt having a thread complemental to the nut, the bolt being adapted to pass through the hole in the sideboard and threadedly engage nut in the mounting bracket, thereby attaching the mounting bracket to the sideboard such that the mounting bracket is operable to pivot with respect to the sideboard about the longitudinal axis of the bolt, and (d) a tension adjustment mechanism operable to adjust the friction force between the sideboard and the mounting bracket, the tension adjustment mechanism comprising:

(i) a handle adapted to engage the bolt and operable to transmit a rotational force to rotate the bolt thread with respect to the nut in the mounting bracket, and (ii) a thrust ball bearing adjacent the sideboard, positioned to circumscribe the bolt and aligned to bear thrust substantially parallel to the longitudinal axis of the bolt, whereby the tension adjustment mechanism may be operated to adjust the friction force to retain the optical tube in a desired disposition and the optical tube may subsequently be rotated about the longitudinal axis of the bolt without necessitating that the tension adjustment mechanism be operated to readjust the friction force.

18. An apparatus as claimed in claim 17:

(a) wherein the mounting bracket has a bearing surface opposite the sideboard, (b) further comprising a sheet of highly frictional positioned between the sideboard and the bearing surface and operable to oppose pivoting of the mounting bracket about the longitudinal axis of the bolt, and (c) wherein the tension adjustment mechanism further includes:

(i) a washer mounted on the bolt, and (ii) a threaded washer mounted on the bold and threadedly engaging the bolt thread, such that the washer and the threaded washer are operable to apply opposing forces to the opposite faces of the thrust ball bearing, and such that the washer, the thrust ball bearing and the threaded washer are located between the handle and the sideboard.

* * * * *